Patented Nov. 12, 1935

2,021,046

UNITED STATES PATENT OFFICE 2,021,046

PROCESS FOR DEVULCANIZING RUBBER

Charles H. Campbell, Kent, Ohio

No Drawing. Application May 29, 1935,
Serial No. 24,084

20 Claims. (Cl. 18—52)

The present invention relates to an improved process in the recovery or reclaiming of rubber from vulcanized rubber scrap which produces an improved reclaimed rubber having improved physical and aging characteristics.

Reclaiming oils have been and are being used at the present time in connection with the recovery of rubber from various materials which include or incorporate vulcanized rubber therein. The oils used are for the purpose of softening the rubber particles in the rubber scrap and giving the reclaimed rubber sufficient tack so that it can be properly milled and sheeted or massed for further use.

The wearing quality of rubber is primarily due to the quantity of gas black the manufacturer is able to incorporate in many of his compounds. This being true, it is very much more difficult today to devulcanize rubber than heretofore. In fact, it is necessary to first swell and open the ground vulcanized rubber particles before it is possible for the desulphurizing agents and softening oils used to properly function.

With this increasing use of gas black, particularly in the tire industry, the percentage of tailings is increasing out of all proportion to the added use of the gas black, showing the oils now in use are not giving the desired results.

By tailings, I mean those small, hard particles of ground, vulcanized rubber scrap which have not been sufficiently swelled and softened during the devulcanizing process to permit milling to a smooth, homogeneous sheet.

Should enough of the oil in present use be added to the stock to cut the tailings to the desired point the finished reclaim would be too tacky to permit its use.

In the large plants these tailings run from about 15% with passenger tires to 30% or more with bus and truck tires. These tailings may again be treated, but this requires added handling and increased expense. It is estimated each 1% of tailings cost the well organized reclaiming plant $5,000.00 per year.

In the best process known at the present time, and extensively practised, from three to four percent of caustic soda is used, this quantity being based on the weight of ground rubber scrap. The castic soda in solution is mixed with the ground rubber scrap and the free sulphur present is taken up by the caustic soda. Reclaiming oils are added, and those in constant use are the very heavy oils, such as "still bottoms" produced by the mineral oil industry, or the heavy fractions produced by the coal tar industry, such as phenol, cresol, naphthalen, creosote oil, etc.; also vegetable oils and balsams. With the use of oils of either type referred to, the rubber particles are merely softened on the outer surface, and because these oils do not penetrate, the inner core remains hard as evidenced by the large percentage of tailings remaining after the milling of the reclaimed rubber.

These processes are carried on with the use of horizontal or vertical digestors of well known construction and operation and a description of such digestor is believed to be unnecessary as many types are in use. All digestors, either vertical or horizontal, are furnished with mixing arms to expedite the process.

The function of a good reclaiming oil should be not only to soften the rubber scrap, but also to cause the vulcanized ground rubber particles to swell. If a proper combination of penetrating or high capillary action oils are used, the rubber scrap in the digestor under the action of heat, pressure and moisture will swell and open, and this not only gives the desulphurizing agent and softening oils used an added opportunity to function, but permits the use of smaller percentages of softening oils, thus preventing undesirable tack and more efficiently softening the rubber scrap.

The original objective, therefore, was not only to find a combination of oils or oil that would swell and open the vulcanized ground rubber scrap in the digestor under the action of heat pressure and moisture, but also soften the scrap without causing it to become too tacky for final compounding on warm or hot mills.

I finally found a new combination of oils for use in reclaiming rubber consisting of light oil from the distillation of coal and also a manner of introducing same into the digestor without fear of explosion due to the low flash point of light oil.

Without exception all reclaiming oils now in use have a high flash point and can be introduced into hot digestors without fear of explosion, whereas light oil from its very nature should be specially handled to prevent trouble.

In the manufacture of gas, either for illuminating or heating purposes, from the distillation of coal, after the gas is freed from tar and ammonia it is cooled down to 25° C. and is then scrubbed with a petroleum oil distilling between 250° and 350° C. After the gas is cooled to 25° C., it is then passed through the benzol washers flowing countercurrent to the absorbent or wash oil which removes the so-called light oil from the gas. In the wash oil or absorbent oil still, the light oil is then distilled from the wash oil.

If, in this process, the heat applied is not too high, there is practically little or no wash oil distilled over with the so-called light oil. The best absorbent or wash oil is a mineral straw oil which distills at between 250° and 350° C. and is used practically exclusively as a scrubbing oil. This particular absorbent oil furnished by any of the large oil companies is particularly adapted to scrubber work because it acts as a solvent and picks up the light oils from the gas. This light oil includes the benzols, toluol, the three xylols, and the heavy solvents.

The combination of oils produced from this scrubbing process is known to the trade as "light oil." It is, of course, understood that light oil has been produced by the industry ever since the inception of the modern condensing still. It is also a fact that this oil has never been sold to any trade at any time "as is"; that it is even difficult to obtain a sample of such oil. It is always sold to the refiners and shipped to the oil refineries for distillation into its various component parts. Benzol, for the sake of example, may be used in stepping up winter grades of gasoline, or as a solvent, toluol in explosives, xylol in the dye industry, and heavy solvents in a multitude of industries. The point at issue is, these materials, while each well known in itself, and while each in itself has a well recognized field of usefulness, have never been used in the reclaiming industry because the very low flash point of light oil would render it totally unfit for use in hot digestors under ordinary working conditions. But apart from its low flash point light oil does swell and open ground vulcanized rubber scrap and enables a smaller percentage of softening oil to do the work, with an absence of objectionable tack.

Light oil is produced by many companies and may vary in its composition due to temperature, type of still, and coal used. The variation, however, is not great and any light oil can be used to advantage in this process. I prefer, however, to use the cut that distills between 84° C. and 239° C. This cut of light oil, due to its high capillary action and penetrating quality, not only is particularly efficient in small percentages in swelling ground vulcanized rubber scrap under heat, pressure and moisture, but also softens without too much tack.

I desire to draw attention to the fact that light oil is non-saponifiable and that light oil has practically no desulphurizing action. The fact the oils used are non-saponifiable means they have no effect upon the caustic soda present during the devulcanizing process and the caustic soda or other desulphurizing agent is enabled to perform its real function.

In the ordinary process in which tars or balsams or other vegetable products are used in connection with caustic soda in the digestor, the caustic is utilized to a great extent and under the action of heat, pressure and moisture soaps are formed, and in this way largely defeat the purpose for which the caustic was intended.

I have found that benzol, toluol, xylol, or the heavy solvents when mixed separately with rubber scrap do not give the desired results; that in some cases the tailings run as high as twenty-five to thirty-five percent with a rough, hard sheet of milled reclaimed rubber. I found in practice that a reclaiming oil that would range from sixty to seventy percent of high flash, benzol, toluol and xylol, and but forty to thirty percent heavy solvent, gave very much the best results in the devulcanization process.

Analyses taken over a period of ten years, of a special "light oil", disclose that this light oil during the colder months carried an average of benzols 22%, toluol 26%, xylols 19%, and heavy solvents 33%.

The following distillation range gives a range of high capillary action light oil that gives the results herein specified and desired:

Specific gravity at 60° F _____ .8899
Distillation:

| | ° C. |
|---|---|
| Start | 84 |
| 10% | 100 |
| 20% | 106 |
| 30% | 112 |
| 40% | 119 |
| 50% | 129 |
| 60% | 140 |
| 70% | 149 |
| 80% | 170 |
| 90% | 200 |
| Dry | 239 |

At 138° C. the high flash, benzols, toluol and xylols have distilled over and the heavy solvents are beginning to distill. The heavy solvents make for tack and lack the penetrating and swelling qualities of the lighter fractions, but a limited tack is necessary for proper massing and sheeting.

A manner of introducing this light oil into a digestor without danger of explosion is to introduce the oil into the bottom of the digestor by means of a pipe, first a shot of oil and then a shot of water to clean the pipe. The digestor in this case should first contain the rubber scrap with water to cover same. The digestor should be closed and the air within the digestor should be withdrawn or expelled. The oil coming into contact with the rubber scrap and water is broken up into small particles, thereby insuring a coating of the particles of ground rubber scrap. Danger also can be eliminated by filling the digestor with $CO_2$ gas and then pumping the oil either in suspension, minute globules or "as is".

Also danger is eliminated if this light oil is introduced into a digestor within which a watery vapor atmosphere has been created. This may be done by blowing the oil into a pipe carrying water with compressed air or $CO_2$ gas and on into the digestor while the scrap is being added, or by passing the oil and water through a high speed centrifugal pump, and on into the digestor, or, preferably, by passing the oil or combinations of oils through a colloid mill in the presence of water with or without a stabilizing agent. The best suspension for this purpose is usually obtained by mixing two parts of water with one part of oil and using a stabilizer preferably one to two percent of the weight of oil employed to prevent the suspension from separating and then passing this mixture through a colloid mill. As stabilizing agents, I can use any of the clays, but preferably bentonite. I could also use glue, soap, ammonium linolate, or any of the chemical stabilizing agents for sale on the open market.

A temporary suspension can be made by passing water and oil through a colloid mill, and this will hold the oil in suspension for a period long enough to enable the suspended particles of oil to be introduced into the digestor in a watery vapor atmosphere and to coat the rubber particles present. The idea involved is that with the oils in minute or colloidal suspension each little particle of rubber scrap will find its particle of oil, with the result that but smaller percentages of oil are needed to swell and soften the rubber scrap.

It is known from practical experience that this combination of oils has a greater affinity for the rubber scrap than for the water, even in spite of the fact a stabilizing agent may be used. This is true because on a 40,000 pound digestor test the finished reclaimed rubber showed but nine percent of tailings as against an average of fifteen percent tailings for this particular plant according to their process and with the use of exceptionally high grade reclaiming oils.

Test #1

In determining the efficiency of this particular combination of oils, I based my results upon a one year's average run by this particular plant in which they used the highest priced and concededly one of the best reclaiming oils on the market. The average results of the use of this oil for the year, while concededly producing a high-class reclaimed rubber, gave an average of fifteen percent tailings. In the case of my "light oil" used in my experiment I took an average load of 45,000 pounds of the same rubber scrap the plant had been using for the past year. This scrap was ground to the same mesh by the same machinery and at no time was the process varied in any way or particular, the only change being that I used two and one-half percent of my "light oil" as compared to three percent of the oil ordinarily used. Otherwise, the same percentages of desulphurizing agents were used. The same amount of water and same steam pressure and periods of times were employed. As a result of this 45,000 pound test of scrap, I obtained a better finished reclaim with a smoother, glossier surface and a reclaim that gave but nine percent of tailings. 195 pounds of steam pressure was used for nineteen hours, after which the digestors were blown down and the scrap washed.

Test #2

In this particular test I had one part of my "light oil" mixed with two parts of water and passed through a colloid mill and pumped into the digestors. 14,000 pounds of ground rubber scrap were used as before, all other conditions being equal, and but two and one-fourth percent of light oil which was in colloidal suspension. As a result of this 14,000 pound test, a finished reclaim was obtained that gave in every particular all of the results obtained by the larger percentage of my light oil heretofore used and more than equal to the best result obtained by the oil in regular use in the plant. Nine percent tailings resulted in this case also. The plant in question, in common with several other large plants in this country, figure that a reduction of each one percent in the total tailings per year means an annual saving of $5,000.00. This saving, due to reduction in tailings and increase in the quality and quantity of the finished reclaimed rubber plus the saving due to the reduction in the percentage of the oil employed, presents a very noticeable advance in the art of reclaiming rubber. This oil if used in the devulcanization process, on account of its penetrating and softening quality, requires but from 2¼ to 2½% to produce a reclaim with but nine percent tailings as against three to four percent of the best oils at present available on the market with an average of fifteen percent tailings. The percentages of oil used are against the weight of rubber scrap used.

While I have set forth range limits with respect to these oils, it is obvious the percentages of benzol, toluol and xylol or toluol and xylol needed to swell and open, but not dissolve, the ground particles of rubber scrap will vary with the composition of the scrap and the percentages of gas black, carbon black or substitutes therefor present. Also the percentages of the heavy naphtha solvents needed to soften the rubber scrap and cause it to mass and sheet on the mills will also vary for the same reasons. It would be possible to use up to 25% of these oils without effecting solution of the rubber. But range limits given, on present day average rubber scrap, have produced results that are a decided improvement over present day methods.

While benzol, toluol or xylol each in itself will act upon ground rubber scrap in varying degrees, I prefer the combined action of benzol, toluol and xylol, or of toluol and xylol, to either alone. These oils swell with little or no tack but when used alone produce a dry, harsh sheet of finished reclaimed rubber. The heavy naphtha solvents impart the needed softening and tack without rendering the stock too tacky for use on hot mills.

The percentages given with respect to benzol, toluol, xylol and heavy solvents do penetrate and cause the vulcanized rubber particles to swell and soften.

Furthermore, these oils, on account of their high penetrating quality, can be mixed with other reclaiming oils to advantage.

What is claimed is:

1. That step in the process of devulcanizing ground vulcanized rubber scrap which consists of introducing an oil including essentially benzol, toluol, xylol and heavy solvent into a digestor in the presence of desulphurizing agent, which upon the application of heat, moisture and pressure causes the rubber particles to swell and soften, and thereby permits the desulphurizing agent used to react upon the sulphur present in the vulcanized rubber.

2. That step in the process of devulcanizing ground vulcanized rubber scrap which consists of introducing an oil including essentially benzol, toluol, xylol and heavy solvent in colloidal suspension into a digester in the presence of a desulphurizing agent, which upon the application of heat, moisture and pressure causes the rubber of heat, moisture and pressure causes the rubber particles to swell and soften, and thereby permits the desulphurizing agent used to react upon the sulphur present in the vulcanized rubber.

3. That step in the process of devulcanizing ground vulcanized rubber scrap which consists of introducing an oil, including essentially benzol, toluol, xylol and heavy solvent into a digestor in the presence of a desulphurizing agent in such a manner that the oil is broken up into minute globules which upon the application of heat, moisture and pressure causes the rubber particles to swell and soften, and thereby permits the desulphurizing agent used to react upon the sulphur present in the vulcanized rubber.

4. That step in the process of devulcanizing ground vulcanized rubber scrap which consists of introducing an oil, including essentially toluol, xylol and heavy solvent, into a digestor in the presence of a desulphurizing agent which upon the application of heat, moisture and pressure, causes the rubber particles to swell and soften, and thereby permits the desulphurizing agent used to react upon the sulphur present in the vulcanized rubber.

5. That step in the process of devulcanizing ground vulcanized rubber scrap which consists of introducing an oil, including toluol essentially and xylol in relative proportions of approximately three to two and not less than 20% of heavy solvent into a digestor in the presence of a desulphurizing agent which upon the application of heat, moisture and pressure causes the rubber particles to swell and soften, and thereby permits the desulphurizing agent used to react upon the sulphur present in the vulcanized rubber.

6. That step in the process of devulcanizing ground vulcanized rubber scrap which consists of introducing an oil including essentially benzol, toluol, xylol and heavy solvent into a digestor provided with a watery vapor atmosphere and in the presence of a desulphurizing agent, which upon the application of heat, moisture and pressure causes the rubber particles to swell and soften, and thereby permits the desulphurizing agent used to react upon the sulphur present in the vulcanized rubber.

7. That step in the process of devulcanizing ground vulcanized rubber scrap which consists of introducing an oil including essentially benzol, toluol, xylol and heavy solvent into a digestor from which the air has previously been withdrawn or expelled.

8. That step in the process of devulcanizing ground vulcanized rubber scrap which consists of introducing an oil including essentially toluol, xylol and heavy solvent into a digestor from which the air has previously been withdrawn or expelled.

9. That step in the process of devulcanizing ground vulcanized rubber scrap which consists introducing an oil including essentially benzol, toluol, xylol and heavy solvent into a digestor in an atmosphere of carbon dioxide gas.

10. That step in the process of devulcanizing ground vulcanized rubber scrap which consists of introducing an oil, including essentially toluol, xylol and heavy solvent, into a digestor in an atmosphere of carbon dioxide gas.

11. The process of devulcanizing ground rubber scrap containing high percentages of carbon black, which comprises introducing an oil including essentially benzol, toluol, xylol and heavy solvent into a heated digestor in the presence of a devulcanizing agent and water.

12. The process of devulcanizing ground rubber scrap containing high percentages of carbon black, which comprises introducing an oil including essentially toluol, xylol and heavy solvent into a heated digestor in the presence of a devulcanizing agent and water, and maintaining a non-explosive atmosphere within the digestor.

13. The process of devulcanizing ground rubber scrap containing high percentages of carbon black, which comprises introducing an oil including essentially benzol, toluol, xylol and heavy solvent into a heated digestor in the presence of a devulcanizing agent and water.

14. The process of devulcanizing ground rubber scrap containing high percentages of carbon black, which comprises introducing an oil including essentially benzol, toluol, xylol and heavy solvent into a heated digestor in the presence of a devulcanizing agent and water, and maintaining a non-explosive atmosphere within the digestor.

15. That step in the process of devulcanizing ground vulcanized rubber scrap which consists of introducing an oil, including essentially toluol, xylol and heavy solvent, in colloidal suspension into a digestor in the presence of a desulphurizing agent, which upon the application of heat, moisture and pressure causes the rubber particles to swell and soften, and thereby permits the desulphurizing agent used to react upon the sulphur present in the vulcanized rubber.

16. That step in the process of devulcanizing ground vulcanized rubber scrap which consists of introducing an oil, including essentially toluol, xylol and heavy solvent, into a digestor in the presence of a desulphurizing agent in such a manner that the oil is broken up into minute globules which upon the application of heat, moisture and pressure causes the rubber particles to swell and soften, and thereby permits the desulphurizing agent used to react upon the sulphur present in the vulcanized rubber.

17. That step in the process of devulcanizing ground vulcanized rubber scrap which consists of introducing an oil including essentially toluol, xylol and heavy solvent into a digestor provided with a watery vapor atmosphere and in the presence of a desulphurizing agent, which upon the application of heat, moisture and pressure causes the rubber particles to swell and soften, and thereby permits the desulphurizing agent used to react upon the sulphur present in the vulcanized rubber.

18. The process of devulcanizing ground rubber scrap containing high percentages of carbon black, which comprises introducing an oil, including essentially toluol, xylol and heavy solvent, into a heated digestor in the presence of a devulcanizing agent and water, and maintaining a non-explosive atmosphere within the digestor.

19. That step in the process of devulcanizing ground vulcanized rubber scrap which consists in treating the scrap with an oil including essentially benzol, toluol, xylol and heavy solvent, and applying heat to the treated scrap, so as to cause the ground rubber particles to swell and soften without effecting solution of the rubber.

20. That step in the process of devulcanizing ground vulcanized rubber scrap which consists in treating the scrap with an oil including essentially toluol, xylol and heavy solvent, and applying heat to the treated scrap, so as to cause the ground rubber particles to swell and soften without effecting solution of the rubber.

CHARLES H. CAMPBELL.